(12) United States Patent
Stenton et al.

(10) Patent No.: US 7,274,507 B2
(45) Date of Patent: Sep. 25, 2007

(54) TWO-MIRROR TELESCOPE WITH CENTRAL SPIDER SUPPORT FOR THE SECONDARY MIRROR

(75) Inventors: William Conrad Stenton, Midland (CA); Gabor Devenyi, Penetang (CA); Blaise Rene Robitalle, Penetang (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/271,418

(22) Filed: Nov. 9, 2005

(65) Prior Publication Data
US 2007/0103771 A1 May 10, 2007

(51) Int. Cl.
G02B 23/00 (2006.01)
G02B 5/10 (2006.01)

(52) U.S. Cl. .................. 359/399; 359/208; 359/859; 359/871

(58) Field of Classification Search ........ 359/362–366, 359/838–880, 399–410, 200–214, 856–861
See application file for complete search history.

(56) References Cited

U.S. PATENT DOCUMENTS

| | | | |
|---|---|---|---|
| 2,948,189 A | 8/1960 | Fischer | 359/363 |
| 3,064,526 A | 11/1962 | Lindsay | 359/503 |
| 4,134,638 A | 1/1979 | Drauglis | 359/364 |
| 4,581,615 A | 4/1986 | Levy | 343/255 |
| H783 H | 6/1990 | Callender | |
| 5,181,145 A * | 1/1993 | Eden | 359/859 |
| 5,400,169 A * | 3/1995 | Eden | 359/208 |
| 5,734,516 A * | 3/1998 | Sayede | 359/871 |
| 5,760,979 A | 6/1998 | Saito | 359/859 |
| 6,118,579 A | 9/2000 | Endemann | 359/366 |
| 6,686,889 B1 | 2/2004 | Kwon et al. | 343/760 |

* cited by examiner

*Primary Examiner*—Thong Q. Nguyen
(74) *Attorney, Agent, or Firm*—Leonard A. Alkov; H. Saint St. Julian; John J. Horn

(57) ABSTRACT

A telescope has a primary light mirror structure including a central base, and a concave primary mirror having a central opening in which the central base is received and extending radially outwardly from the central opening. The concave primary mirror has an inner margin adjacent to the central opening. A secondary light mirror structure includes a secondary mirror having a center and an outer periphery. The secondary mirror faces the concave primary mirror and the central base of the primary light mirror structure. A spider support extends between the inner margin of the concave primary mirror and the center of the secondary mirror facing the central base. The spider support does not extend to the outer periphery of the secondary mirror. The spider support has openings therethrough to permit light rays to pass between the secondary mirror and the central base of the primary light mirror structure.

14 Claims, 2 Drawing Sheets

TWO-MIRROR TELESCOPE WITH CENTRAL SPIDER SUPPORT FOR THE SECONDARY MIRROR

This invention relates to the structure of a two-mirror telescope having a concave primary mirror and a secondary mirror, and more particularly to the structural support of the secondary mirror.

BACKGROUND OF THE INVENTION

One form of an all-reflective telescope has a concave primary mirror and a secondary mirror positioned in facing relation to the primary mirror. Incoming light rays are reflected from the primary mirror to the secondary mirror. The secondary mirror reflects the light rays to a detector positioned in the center of the primary mirror.

The secondary mirror is supported in its proper position facing the primary mirror. A conventional approach is to use a "spider", which in one embodiment is a multi-armed structure extending from the primary mirror to the outer periphery of the secondary mirror. The arms of the spider position the secondary mirror in three dimensions relative to the primary mirror and relative to the detector. The spider has appropriate openings therethrough so that the light rays can reflect from the primary mirror to the secondary mirror, and thence back to the detector.

The conventional spider does provide the required support for the secondary mirror. However, during the development of the present invention, the inventors have identified some disadvantages with the current approach. The assembly of primary mirror, secondary mirror, and spider requires the use of three (or more) high-precision parts, in addition to the detector structure. The three parts must be manufactured and assembled with high precision, and maintained in precise alignment when the telescope is used. These requirements increase the costs associated with fabricating and maintaining the telescope.

There is a need for an improved approach to the construction of the two-mirror telescope, which achieves the required structural support while reducing the complexity and manufacturing, assembly, and alignment difficulties associated with the present approach. The present invention fulfills this need, and further provides related advantages.

SUMMARY OF THE INVENTION

The present invention provides a two-mirror telescope with reduced structural complexity and improved manufacturability and maintainability. The present approach is operable with a form of the two-mirror telescope in which the central portion of the secondary mirror is not required for reflection, so that it may be used for structural attachment. The structure allows the reflective telescope to be made in one or two pieces, reducing the costs of manufacturing and reducing the difficulties with achieving and maintaining alignment.

In accordance with the invention, a telescope comprises a primary light mirror structure including a central base and a concave primary mirror having a central opening in which the central base is received and extending radially outwardly from the central opening. The concave primary mirror has an inner margin adjacent to the central opening. A secondary light mirror structure includes a mirror having a center portion and an outer periphery. The mirror of the secondary light mirror structure is preferably convex, but it may be concave. The secondary mirror faces, but is spaced apart from, the concave primary mirror and the central base of the primary light mirror structure. A spider support extends between the inner margin of the concave primary mirror and the center portion of the secondary mirror facing the central base. The spider support does not extend to the outer periphery of the secondary mirror. The spider support has openings therethrough to permit light rays to pass between the secondary mirror and the central base of the primary light mirror structure. The concave primary mirror and the secondary mirror are preferably rotationally symmetric about a central axis passing through the center of the central opening of the concave primary mirror and through the secondary mirror. The spider support is preferably rotationally symmetric about the central axis.

The present approach permits several different useful embodiments. In one, the concave primary mirror, the secondary mirror, and the spider support are a single integral piece. This structure requires no assembly, and orientations and alignments are automatically retained. In another embodiment, the concave primary mirror, the secondary mirror, and the spider support comprise exactly two pieces. Most preferably for this embodiment, the secondary mirror and the spider support are a single integral piece, and there is a precision joint between the primary light mirror structure and the spider support. This embodiment, while using two separate pieces for the basic mirror structure, is more easily fabricated than the single-piece embodiment.

The telescope is readily fabricated as one or two pieces (in addition to the central base). The two-piece telescope is most easily machined, but requires a single precision interface between the two pieces. The one-piece telescope is more complex to machine than the two-piece embodiment, but requires no assembly and no attention to the maintaining of alignment during its lifetime.

In most cases, the primary light mirror structure further includes a light transceiver mounted in the central base facing the secondary mirror, most preferably in the form of a light receiver or detector. A light transmitter or a passive structure may also be used.

In the present approach, the spider support extends to the center portion of the secondary mirror, so that the center portion of the secondary mirror is not available for light reflection. For some applications, this unavailability of the center portion of the secondary mirror is fully acceptable. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
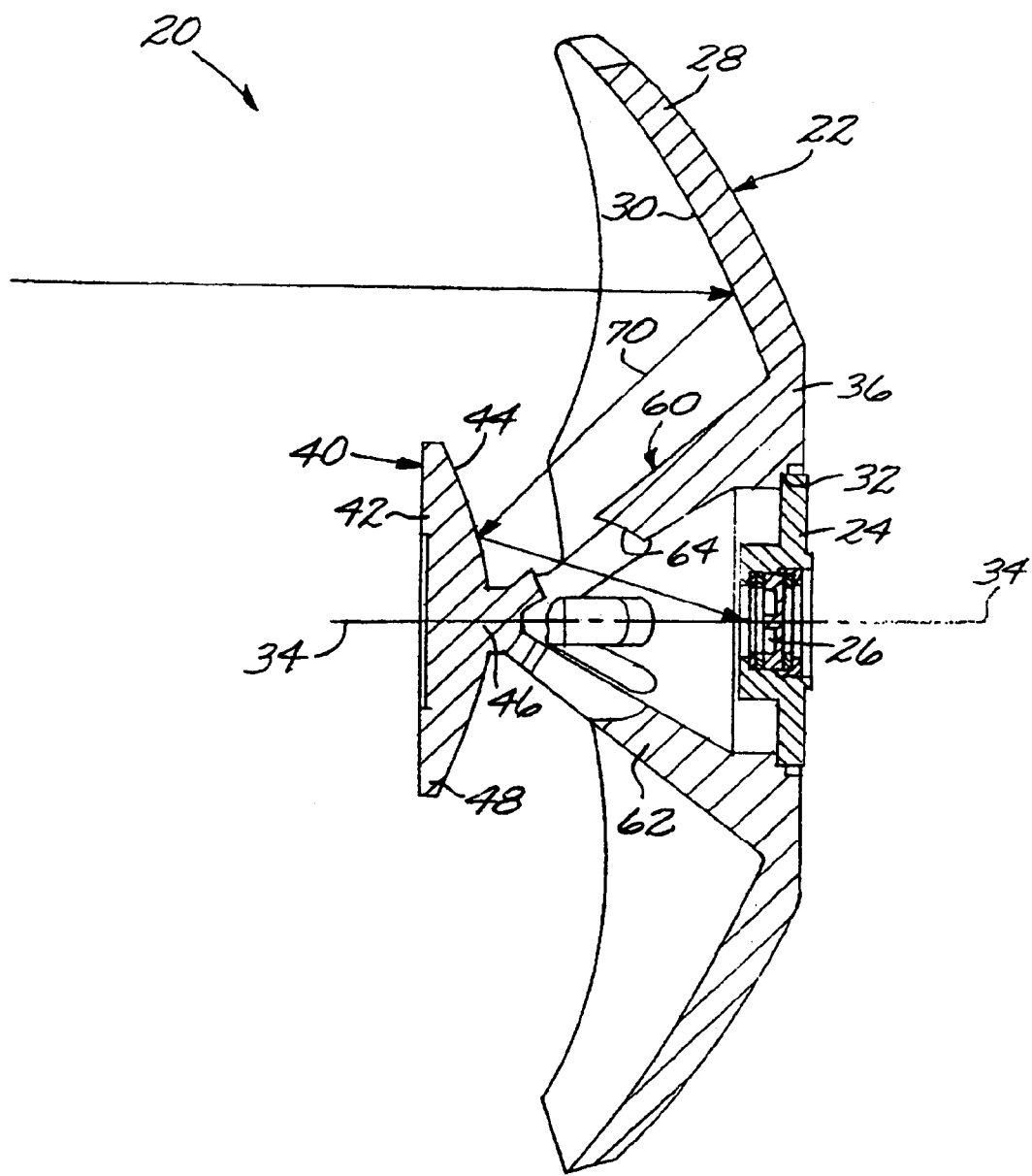
FIG. 1 is a sectional view of a first embodiment of the two-mirror telescope.
Figure 2:
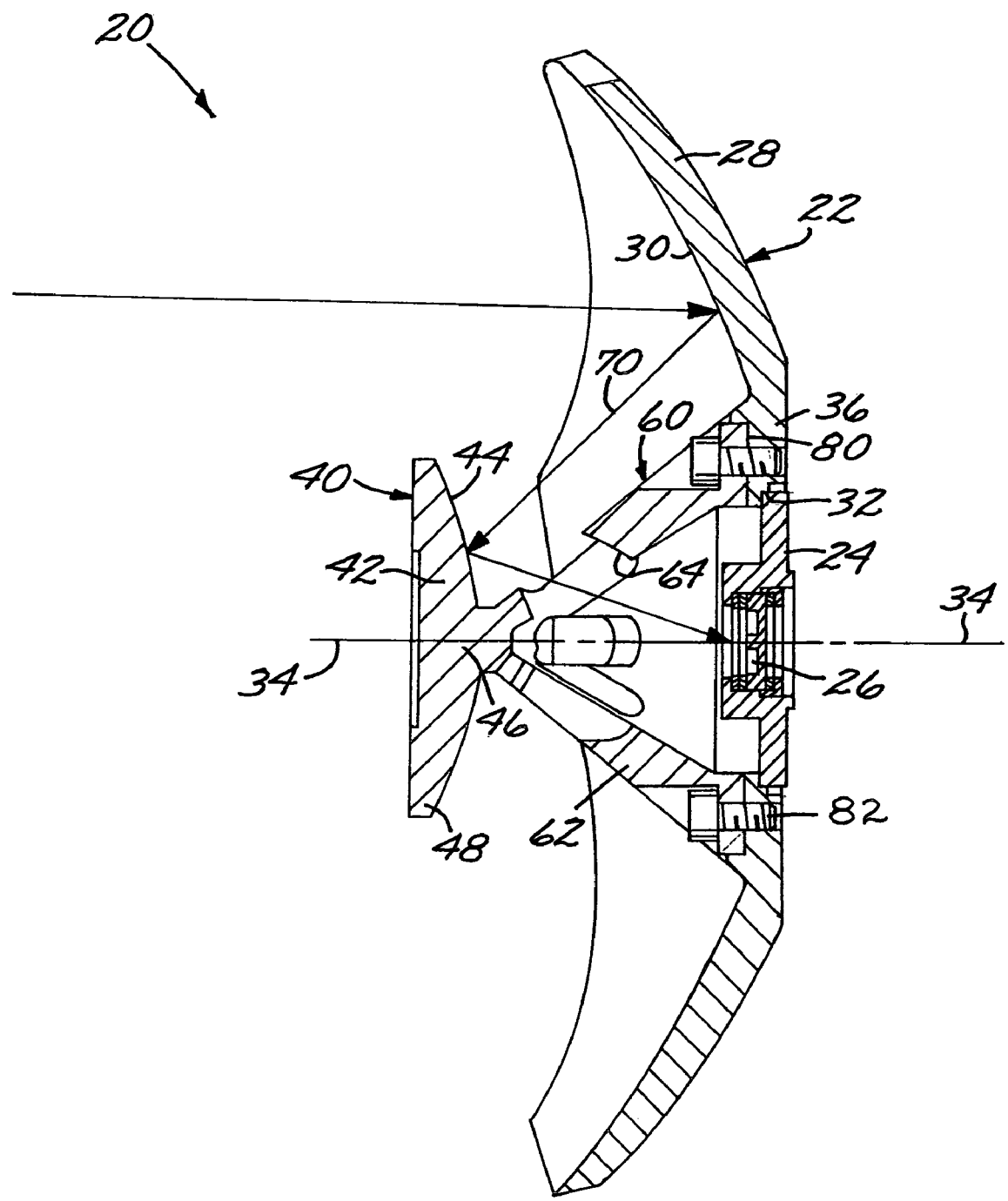
FIG. 2 is a sectional view of a second embodiment of the two-mirror telescope.

FIGS. 1-2 illustrate two preferred embodiments of the two-mirror telescope. The two embodiments are similar, and the following description applies to both embodiments except as will be discussed.

A telescope 20 has a primary light mirror structure 22 including a central base 24. There is a light transceiver 26 in the central base 24. The light transceiver 26 may include a light receiver (i.e., a detector or sensor), a light transmitter, or both, and/or a passive structure such as a reflector. The light transceiver 26 is illustrated as a light receiver, the preferred embodiment. The primary light mirror structure 22 also includes a concave primary mirror 28 having a concave primary mirror surface 30 reflective of light of particular wavelengths of interest. The concave primary mirror 28 has a central opening 32 therethrough in which the central base 24 is received. The concave primary mirror 28 is preferably rotationally symmetric about a central axis 34 that passes through a center of the central opening 32. The concave primary mirror 28 extends radially and symmetrically outwardly from the central opening 32. The concave primary mirror 28 is itself preferably made of a single piece of material (although optical or other coatings may be applied to the single piece of material) which has a portion defined as an inner margin 36 adjacent to the central opening 32.

The telescope 20 further includes a secondary light mirror structure 40 having a secondary mirror 42 with a secondary mirror surface 44 reflective of light of the same wavelengths of interest as reflected by the primary mirror surface 30. The secondary mirror 42 is preferably convex as illustrated, but it may instead be concave. The secondary mirror 42 is itself preferably made of a single piece of material, although optical or other coatings may be applied to the single piece of material. The secondary mirror 42 has a region defined as a center portion 46 and another region defined as an outer periphery 48 of the secondary mirror surface 44. The secondary mirror surface 44 of the secondary mirror 42 faces, but is spaced apart from, the primary mirror surface of the concave primary mirror 28 and the central base 24 of the primary light mirror structure 22. The secondary mirror 42 is preferably rotationally symmetric about the central axis 34 that passes through the center portion 46 of the secondary mirror 42.

A spider support 60 extends between the inner margin 36 of the concave primary mirror 28 and the center portion 46 of the secondary mirror 42 facing the central base 24. The spider support 60 includes several arms 62 with openings 64 therethrough to permit light rays to pass between the secondary mirror 42 and the central base 24 of the primary light mirror structure 22. The spider support 60 does not extend to the outer periphery 48 of the secondary mirror 42, and does not extend to the outer periphery 48 of the secondary mirror surface 44. The spider support 60 is itself preferably made of a single piece of material. The spider support 60 is preferably rotationally symmetric about the central axis 34.

FIGS. 1 and 2 illustrate the light path of an incoming light ray 70. The light ray 70 reflects from the concave primary mirror surface 30 of the concave primary mirror 28 to the secondary mirror 42. The light ray 70 then reflects from the secondary mirror surface 44 of the secondary mirror 42 to the light transceiver 26. An outgoing light ray from the light transceiver 26 would follow an inverse path.

The embodiments of FIGS. 1 and 2 differ in respect to the details of construction. In the embodiment of FIG. 1, the concave primary mirror 28, the secondary mirror 42, and the spider support 60 are a single integral piece. That is, the concave primary mirror 28, the secondary mirror 42, and the spider support 60 are a monolithic structure made of a single piece of material. (The central base 24 and its light transceiver 26 are fabricated separately, and inserted into and retained in the central opening 32.) The concave primary mirror 28, the secondary mirror 42, and the spider support 60 are machined or otherwise produced from a single piece of material, typically a metal such as aluminum. As a result, there are no joints required between these elements, an important advantage because joints must be precision machined, aligned, and maintained in alignment during service. However, in some designs it can be difficult to machine the concave primary mirror 28, the secondary mirror 42, and the spider support 60 as a single integral piece.

In the embodiment of FIG. 2, the concave primary mirror 28, the secondary mirror 42, and the spider support 60 comprise exactly two pieces. In the preferred form, the secondary mirror 42 and the spider support 60 taken together are a single integral piece of a metal such as aluminum, and the concave primary mirror 28 is a single piece of a metal such as aluminum. There is a precision joint 80 between the primary light mirror structure 22 and the spider support 60. (As with the embodiment of FIG. 1, the central base 24 and its light transceiver 26 are fabricated separately, and inserted into and retained in the central opening 32.) In this embodiment, the secondary mirror 42 and the spider support 60 are machined or otherwise fabricated from a single piece of material, and the concave primary mirror 28 is machined or otherwise fabricated from a single piece of the same or a different material. The precision joint 80 is prepared by precision machining faces at the appropriate locations, preferably on the end of the spider support 60 and on the inner margin 36 of the concave primary mirror 28. The precision machining may be accomplished by any operable approach, but single-point diamond turning is presently preferred. The precision-machined faces are mated and retained in the desired position by bolts 82 as illustrated, or by other permanent or semi-permanent retainer. The embodiment of FIG. 2 requires that two pieces be prepared, including precision-machined faces and retainer structure. The precision joint 80 must be aligned during assembly and maintained in alignment. On the other hand, because of the geometry it is usually easier to machine the two pieces of the embodiment of FIG. 2 than to machine the single piece of the embodiment of FIG. 1.

The concave primary mirror 28, the secondary mirror 42, and the spider support 60 may comprise more than two pieces. Such a construction is normally selected for improved manufacturability. However, additional precision joints are required, with the associated increase in complexity in assembly and maintenance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A telescope comprising:
 a primary light mirror structure including
  a central base, and
  a concave primary mirror having a central opening in which the central base is received and extending radially outwardly from the central opening, wherein the concave primary mirror has an inner margin adjacent to the central opening;
 a secondary light mirror structure including
 a secondary mirror having a center and an outer periphery, wherein the secondary mirror faces the concave primary mirror and the central base of the primary light mirror structure; and a spider support extending between the inner margin of the concave primary mirror and the center of the secondary mirror facing the central base, wherein the spider support does not extend to the outer periphery of the secondary mirror, wherein the spider support has openings therethrough to permit light rays to pass between the secondary mirror and the central base of the primary light mirror structure, wherein the telescope is fabricated as two pieces plus the central base, wherein the secondary mirror and the spider support are a single integral piece, and wherein there is a precision joint between the primary light mirror structure and the spider support.

2. The telescope of claim 1, wherein the concave primary mirror, the secondary mirror, and the spider support comprise exactly two pieces.

3. The telescope of claim 1, wherein the primary light mirror structure further includes
a light transceiver mounted in the central base facing the secondary mirror.

4. The telescope of claim 1, wherein the primary light mirror structure further includes
a light receiver mounted in the central base facing the secondary mirror.

5. The telescope of claim 1, wherein the concave primary mirror and the secondary mirror are rotationally symmetric about a central axis passing through a center of the central opening of the concave primary mirror and through the secondary mirror.

6. The telescope of claim 1, wherein the concave primary mirror, the secondary mirror, and the spider support are rotationally symmetric about a central axis passing through a center of the central opening of the concave primary mirror and through the secondary mirror.

7. The telescope of claim 1, wherein the secondary mirror is a convex secondary mirror.

8. A telescope comprising:
a primary light mirror structure including
   a central base,
   a concave primary mirror having a central opening in which the central base is received and extending radially outwardly from the central opening, wherein the concave primary mirror has an inner margin adjacent to the central opening, and
   a light receiver mounted in the central base;
a secondary light mirror structure including
   a secondary mirror having a center and an outer periphery, wherein the secondary mirror faces the concave primary mirror and the central base of the primary light mirror structure; and
   a spider support extending between the inner margin of the concave primary mirror and the center of the secondary mirror facing the central base, wherein the spider support does not extend to the outer periphery of the secondary mirror, and wherein the spider support has openings therethrough to permit light rays to pass between the secondary mirror and the central base of the primary light mirror structure, and wherein there is a precision joint between the primary light mirror structure and the spider support.

9. The telescope of claim 8, wherein the secondary mirror is a convex secondary mirror.

10. The telescope of claim 8, wherein the secondary mirror is a concave secondary mirror.

11. The telescope of claim 8, wherein the concave primary mirror and the secondary mirror are rotationally symmetric about a central axis passing through a center of the central opening of the concave primary mirror and through the secondary mirror.

12. The telescope of claim 8, wherein the concave primary mirror, the secondary mirror, and the spider support are rotationally symmetric about a central axis passing through a center of the central opening of the concave primary mirror and through the secondary mirror.

13. The telescope of claim 8, wherein the concave primary mirror, the secondary mirror, and the spider support comprise exactly two pieces.

14. A telescope comprising:
a concave primary mirror having a central opening in which the central base is received and extending radially outwardly from the central opening, wherein the concave primary mirror has an inner margin adjacent to the central opening;
a secondary mirror having a center and an outer periphery, wherein the secondary mirror faces the concave primary mirror; and
a spider support extending between the inner margin of the concave primary mirror and the center of the secondary mirror facing the central base, wherein the spider support does not extend to the outer periphery of the secondary mirror, wherein the spider support has openings therethrough to permit light rays to pass therethrough, and wherein the telescope is fabricated as exactly two pieces, wherein the secondary mirror and the spider support are a single integral piece, and wherein there is a precision joint between a primary light mirror structure and the spider support.

* * * * *